United States Patent
Dodson

(10) Patent No.: US 6,564,472 B1
(45) Date of Patent: *May 20, 2003

(54) PARTICLE TREATMENT IN A TOROIDAL BED REACTOR

(75) Inventor: Christopher E. Dodson, Oakville (CA)

(73) Assignee: Mortimer Technology Holdings Limited, Reading (GB)

( * ) Notice: Subject to any disclaimer, the term of this patent is extended or adjusted under 35 U.S.C. 154(b) by 378 days.

This patent is subject to a terminal disclaimer.

(21) Appl. No.: 09/643,833

(22) Filed: Aug. 22, 2000

Related U.S. Application Data

(63) Continuation of application No. 09/156,451, filed on Sep. 19, 1998, now Pat. No. 6,108,935.

(51) Int. Cl.⁷ ................................................. F16B 3/08
(52) U.S. Cl. ............................ 34/364; 34/369; 34/588; 34/594
(58) Field of Search ........................ 34/360, 364, 369, 34/372, 426, 578, 583, 588, 594, 66, 180, 181; 210/137, 170, 220, 921; 110/246; 1/346; 208/148, 157, 158, 163, 165

(56) References Cited

U.S. PATENT DOCUMENTS

| | | | | |
|---|---|---|---|---|
| 3,527,575 A | * | 9/1970 | Thompson | 34/369 |
| 4,067,118 A | | 1/1978 | Morin | 34/10 |
| 4,323,312 A | * | 4/1982 | Glatt et al. | 366/102 |
| 4,479,920 A | | 10/1984 | Dodson | 422/143 |
| 4,530,169 A | * | 7/1985 | Okawara | 34/57 |
| 4,559,719 A | * | 12/1985 | Dodson | 34/10 |
| 4,772,193 A | * | 9/1988 | Glatt | 425/222 |
| 4,970,804 A | * | 11/1990 | Huttlin | 34/57 |
| 5,033,205 A | * | 7/1991 | Dodson | 34/10 |
| 5,104,047 A | * | 4/1992 | Simmons | 241/20 |
| 5,282,321 A | | 2/1994 | Hüttlin | 34/57 E |
| 5,357,688 A | | 10/1994 | Christensen | 34/369 |
| 5,589,057 A | * | 12/1996 | Trimble et al. | 208/148 |
| 5,839,207 A | * | 11/1998 | Christensen et al. | 34/369 |
| 6,108,935 A | * | 8/2000 | Dodson | 34/364 |

\* cited by examiner

*Primary Examiner*—Henry Bennett
*Assistant Examiner*—Greg Warder
(74) *Attorney, Agent, or Firm*—Christopher R. Scott

(57) ABSTRACT

The invention provides a process for bringing particulate material into contact with a moving fluid in an annular processing zone to create processed material. The zone has a base and the process includes generating a circumferentially directed flow of gas in the zone to develop a circumferentially circulating turbulent bed of particulate material within the processing zone. Particulate material is supplied to the processing zone so that the particulate material is circulated in the processing zone to provide a predictable particle flow path both circumferential of the processing zone and helically of the zone. The flow path has the following characteristics:

(i) the flow of fluid is controlled to develop the circulating bed with a width between about 2% to 20% of the bed outer extremity diameter, an inner bed depth of less than 1% of the bed diameter, and an outer bed depth between about 2% to 5% of the bed diameter; and (ii) the flow of fluid is directed at an angle relative to the base of the processing zone in the range of about 10° to 45°; and discharging particulate material from the processing zone after processing in the processing zone.

9 Claims, 5 Drawing Sheets

PARTICLE TREATMENT IN A TOROIDAL BED REACTOR

This application is a continuation of application Ser. No. 09/156,451 filed on Sep. 19, 1998 now U.S. Pat. No. 6,108,935

FIELD OF THE INVENTION

This invention relates to improvements in the processing zone of a particulate material processor having a circumferentially directed flow of fluid to develop a circumferentially circulating turbulent toroidal bed of material within the processing zone.

BACKGROUND OF THE INVENTION

Treatment of particulate material commonly uses a fluid but more particularly a gaseous stream. The particulate material may function as a catalyst, absorptive medium or as a source of reactants which react with or are treated by the fluid stream. It has been thought for some time that the best mode for treating beds of particulate material is to fluidize the bed with a gaseous stream. Fluidization of the bed usually results in the particulate material moving randomly in the bed and resembling a random motion similar to boiling water. Exemplary systems for fluidizing beds of material where the material is to be treated are described in U.S. Pat. Nos. 3,527,575; 4,067,118; 4,530,169; 4,970,804; 5,282,321 and 5,357,688. The fluidized beds of these references are of the standard upwardly expanded type which may optionally involve a swirling motion in the bed as developed by angled jets of air such as described in the above U.S. patents.

A vertically expanded annular bed of material is described in U.S. Pat. No. 5,033,205. The circulation of the particulate material in the annular bed is upwardly then outwardly for return to the lower air jet portion of the reactor chamber.

U.S. Pat. No. 4,479,920 describes an annular processing zone for a circumferentially circulating turbulent bed of material. The system is commonly sold under the trade mark TORBED™ and has been used in a variety of particulate treatment applications such as metal ore treatment and roasting; catalytic particle treatment; drying of particulate matter; reacting particles with the gaseous stream; tablet coating; coffee bean roasting and the like. Although this type of annular processing zone is very effective and efficient in treating particulate material due to the uncontrolled random motion of the particles in the swirling turbulent annular bed of material there may be situations when not all particles in the bed are evenly treated and hence a variation in the quality of the final treated particulate product.

In accordance with an aspect of the invention it is desirable to provide an annular processing zone which provides for a predictable particle flow path both circumferentially of the processing zone and helically of the zone to ensure more uniform particle treatment for a given residence time.

SUMMARY OF THE INVENTION

In one of its aspects, the invention provides a process for bringing particulate material into contact with a moving fluid in an annular processing zone to create processed material. The zone has a base and the process includes generating a circumferentially directed flow of gas in the zone to develop a circumferentially circulating turbulent bed of particulate material within the processing zone. Particulate material is supplied to the processing zone so that the particulate material is circulated in the processing zone to provide a predictable particle flow path both circumferentially of the processing zone and helically of the zone. The flow path has the following characteristics:

(i) the flow of fluid is controlled to develop the circulating bed with a width between about 2% to 20% of the bed outer extremity diameter, an inner bed depth of less than 1% of the bed diameter, and an outer bed depth between about 2% to 5% of the bed diameter; and (ii) the flow of fluid is directed at an angle relative to the base of the processing zone in the range of about 100 to 450; and discharging particulate material from the processing zone after processing in the processing zone.

In another of its aspects, the invention provides apparatus for carrying out the process.

BRIEF DESCRIPTION OF THE SEVERAL VIEWS OF THE DRAWINGS.

The invention will be better understood with reference to the drawings, in which.

DETAILED DESCRIPTION OF THE PREFERRED EMBODIMENT(S)

Figure 1:
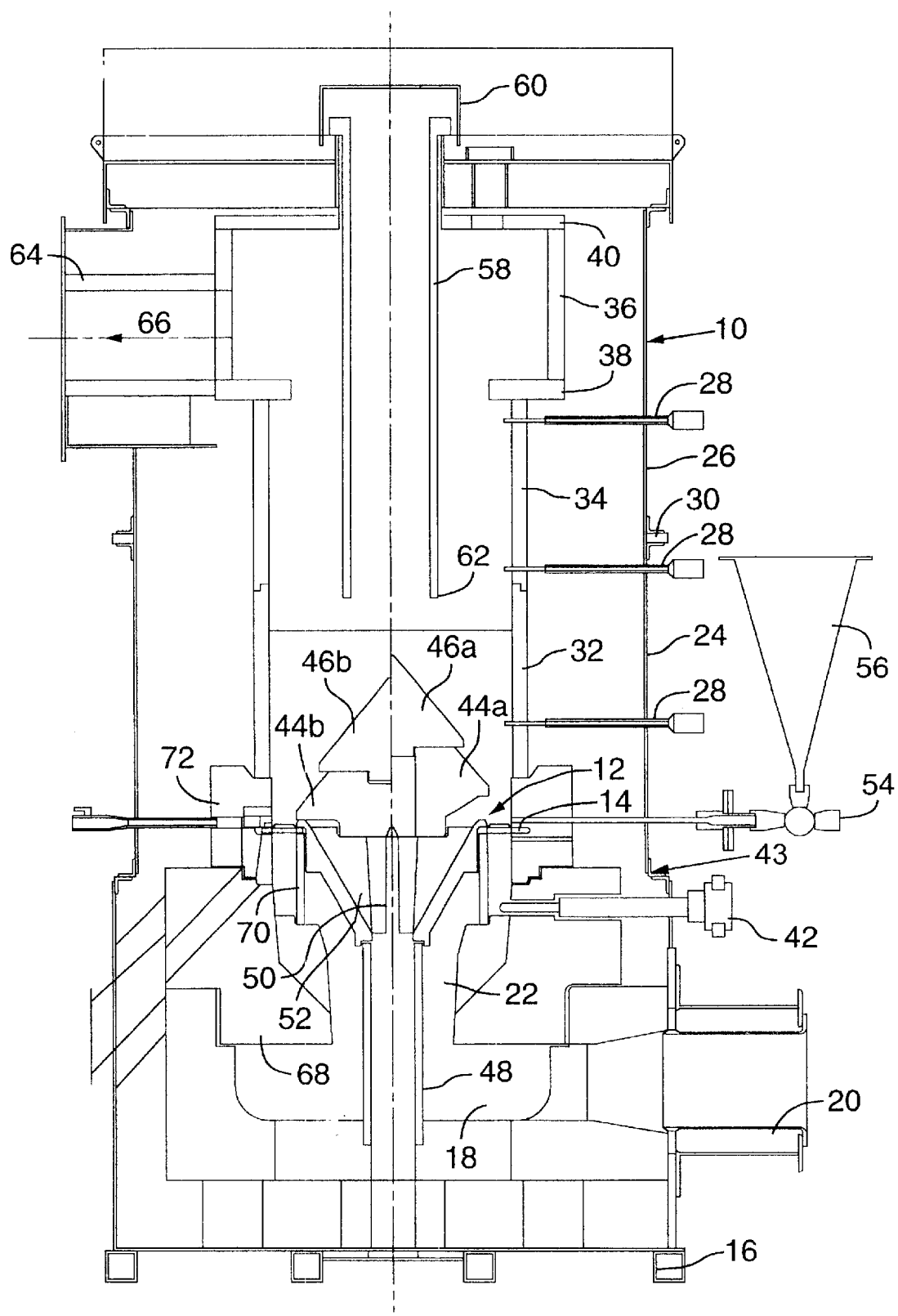
FIG. 1 is a vertical section through a pilot plant reactor designed to run a variety of processes which incorporate the present invention, the section including, two forms of cone structure drawn one to each side of a vertical axis.

In accordance with this invention an improvement is provided in respect of the system for developing an annular processing bed to achieve controlled predictable movement of particles within the circulating bed. Although it is understood that the principle of the invention may be implemented by a variety of fluid or gas distribution designs, various designs will be described which are efficient and effective in developing a circulating bed wherein particles also travel throughout the bed in a helical pattern. This is achieved by judicious selection of the air velocity, bed volume and bed shape. It has been found that the circulating bed can be developed in most reactor shapes and hence specially designed reactor sidewalls are not required such as described in applicant's much earlier U.S. Pat. No. 4,479,920. With reference to FIG. 1 the reactor 10 has an annular processing zone 12 provided above vanes 14. The processing fluid is introduced via a plenum 20 into a mixing chamber 18 into which heat may be provided from optional burners to heat the incoming processed fluid or gas to the desired treatment temperature if ambient temperature is not sufficient. It is also appreciated that the process fluid or gas may be cooled below ambient. The process fluid or gas travels upwardly through, an annular space 22 and is directed through the overlapping vanes 14. The vanes direct the flow of gases in a manner to develop the circumferentially circulating bed of material where the vane shape and various processing controls are utilized to improve activity in the bed and control particle movement therein. The reactor 10 has outer, lower and upper casing shells 24 and 26 through which reactor operating parameter detector probes 28 extend. The upper and lower outer casings are separated by a suitable spacer ring 30. Within the outer casing, reactor lower and upper walls 32 and 34 may be made of refractory material to withstand high temperature treatment. Above the upper reactor wall 34 is the exhaust chamber 36 defined above the process chamber lip 38 and the exhaust chamber lip 40.

In addition to the detector probes 28 a thermocouple detector 42 is provided in the reactor lower portion generally designated 43 for measuring temperature of the process fluid or stream just before it flows upwardly through the vanes 14. Above the vanes 14 is the inner lower cone 44 shown in its upper position 44a as well as the upper cone 46 in its upper position 46a. The upper and lower cones are also shown respectively in their lower positions 44b and 46b. In the upper position central discharge of particulate material is provided down through a support tube 48. Alternatively with the cones in the lower position 44b and 46b the particulate material is prevented from centrally discharging. A funnel 52 is provided which collects the material as it falls downwardly from the circumferential bed past radial ribs 50 and travels out through the support tube 48 (as will be described with reference to FIG. 2). Particulate material may be fed to the circulating bed either through eductor 54 which draws feed material from feed hopper 56 either in conjunction with or in the alternative to the feed hopper 56. Feed of the same or different material may be led through the feed tube 58 which is capped with a removable cap 60. The feed tube 58 extends down into an upper portion defined by wall 34 of the reactor, ending at distal end 62. The material which enters the exhaust chamber 36 is removed via the exhaust outlet 64 in the direction of arrow 66. Usually the material exhausted through outlet 64 is the processing fluid or gas with any entrained fines from the annular circulating bed above the vanes 14.

The vanes 14 are supported by outer vane supports 68 and inner vane support 70. Above the outer vane support 68, is the outer vane retainer 72 for holding the vanes in the horizontal position as shown in FIG. 1.

Figure 2:
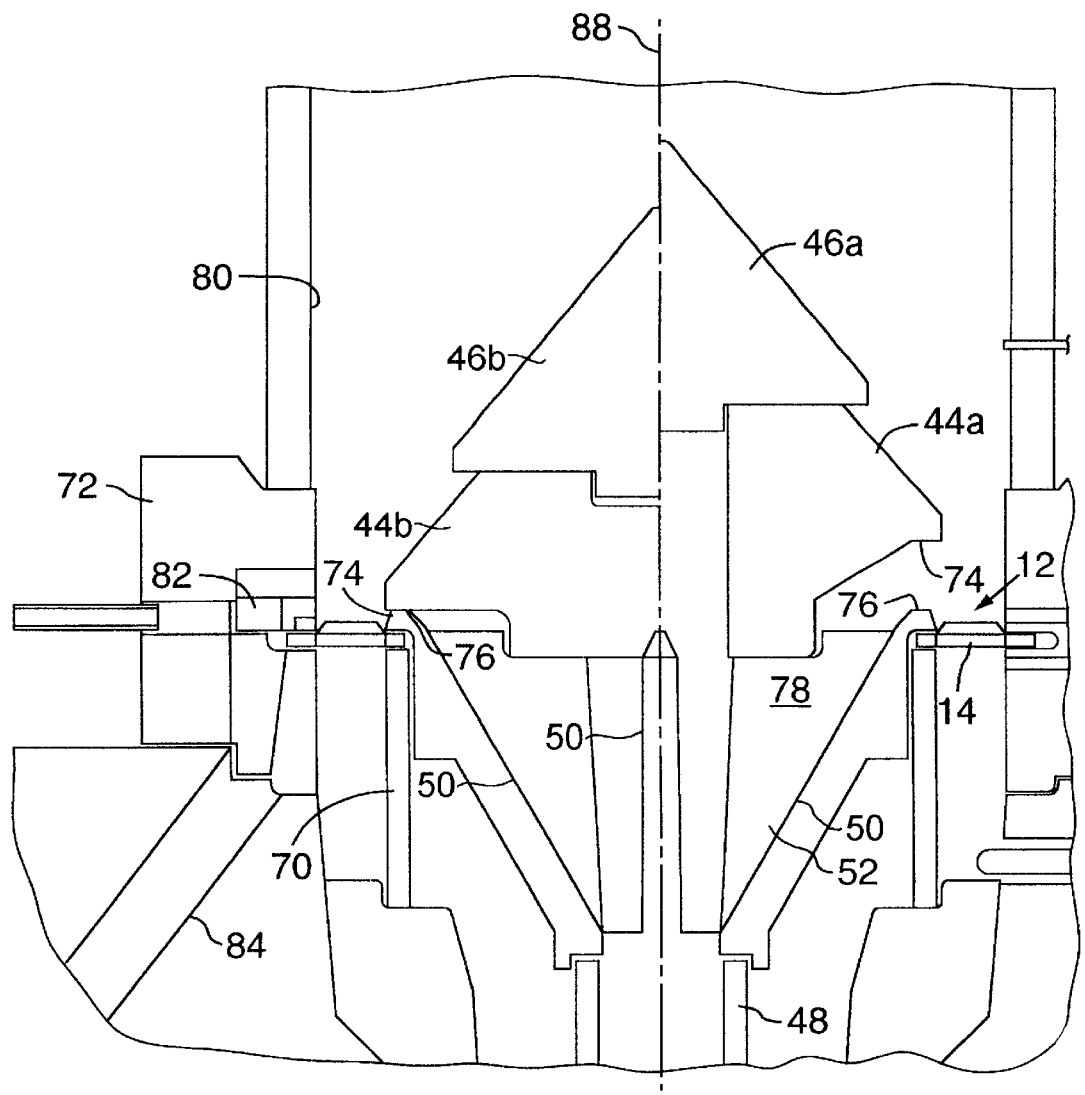
FIG. 2 is an enlarged view of part of FIG. 1 and showing the cone structures and an annular processing zone.

Further details of this aspect of the invention are shown in the enlarged view of FIG. 2 which shows the upper and lower positions of central cones 44 and 46. The lower cone 44 includes a flange 74 which is spaced from a rim 76 of the funnel 52. The spacing between the flange 74 and the rim 76 define a throat 78 which allows material to flow down the throat into the support tube 48. However with the flange 74 resting on the rim 76 the annular processing zone 12 is closed off from the funnel 52. The vanes 14 provide the necessary direction in air flow to develop the desired bed height in the zone 12. Sidewalls 80 are essentially vertical since it is the vane design, velocity and distribution of process fluid or gas flow which defines the circulating bed about the lower and upper cones 44 and 46. A particulate material outlet 82 is also provided which may be used to discharge particulate material from the outside edge of the base of the processing bed. This outlet 82 passes the particulate material onto an angled tube 84 which removes the material from the reactor area.

Figure 3:
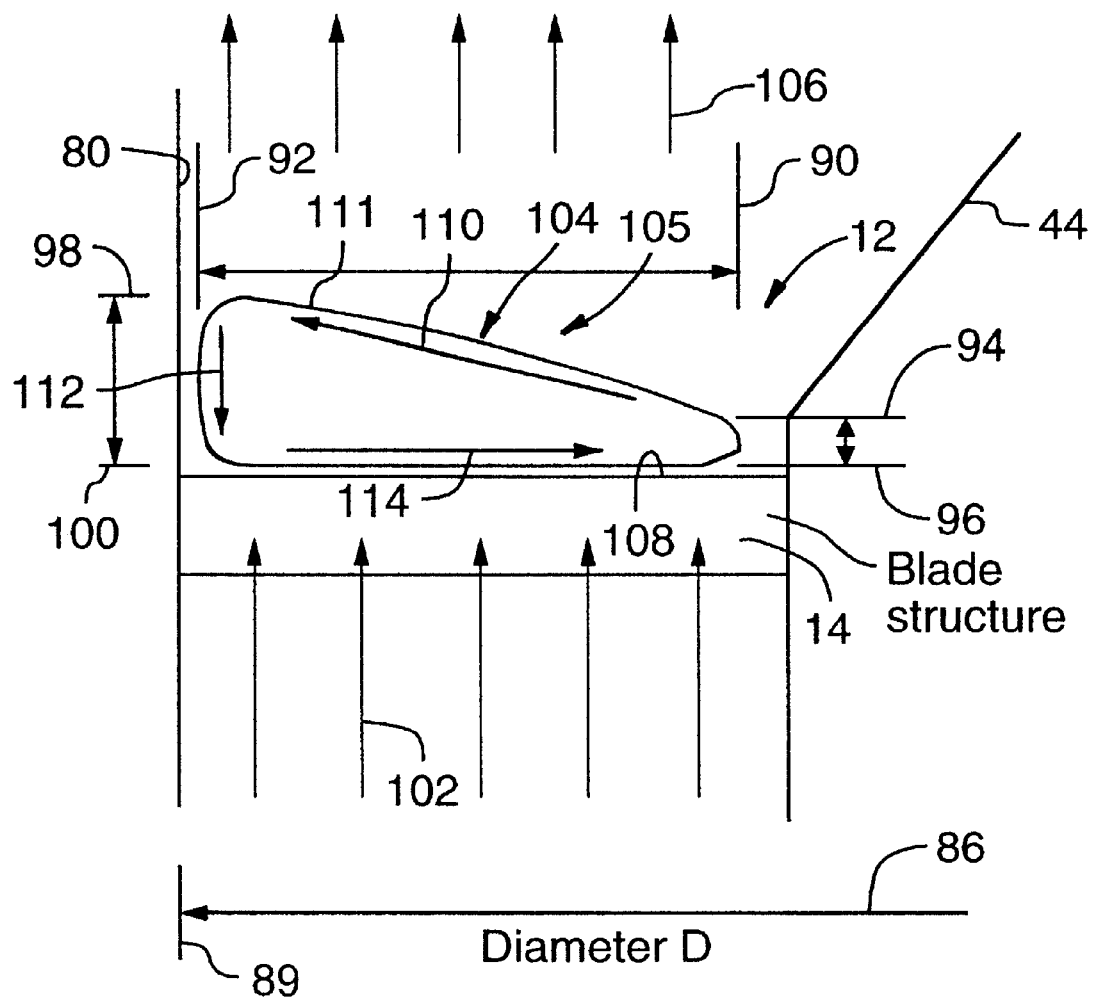
FIG. 3 is a diagrammatic section through the annular processing zone to illustrate particle movement.

The improvement according to the invention which provides the predictable particle flow path is achieved by directing the flow of processing fluid or gas to develop the circulating bed with a width between about 2 to 20% of bed outer extremity diameter. With reference to FIG. 3 the diameter of the outer extremity of the bed is indicated by line 86 which is a diameter passing through the vertical axis 88 of FIG. 2 extending to the extremity of the bed indicated by line [88]89. The bed width as defined between lines 90 and 92 is preferably in the range of 2 to 20% of bed diameter D. The inner bed depth is usually less than 1% of the bed diameter as indicated between lines 94 and 96. The outer bed depth is usually between about 2 to 5% of bed diameter as indicated between lines 98 and 100. It has been found with these bed dimensions a helical particle flow path can be generated as the particles move circumferentially through the reaction zone 12. The processing fluid or gas flows upwardly in the direction of arrow 102, between the vanes 14 and continues upwardly through the bed generally designated 104 in the direction of arrow 106. The flow of gas is directed at an angle relative to the processing zone base generally indicated by line 108 at an angle in the range of about 10 degrees to 45 degrees relative to base 108. The velocity of the processing fluid or gas at the point of impact on the processing zone base 108 as it emerges from between the vanes 14 is greater than the terminal velocity of the largest particles in the bed 104 and less than the terminal velocity of the smallest particles to be retained in the bed 104 in the superficial space 105 immediately above the bed upper surface 111, hence distinguishing the processing zone from the fluidizing structures of the prior art.

It has been found that the distribution of the processing fluid or gas angle (normally in proportion to perimeter) with respect to the plane of the annular process chamber base and fluid velocity must all be in proportion to achieve the controlled and predictable flow of particles within the bed 104. The proportions are such that the height of the bed at the inner region between lines 94 and 96 is less than 1% of the bed diameter. Gases flowing upwardly through the vanes 14 in the direction of arrows 102 elevate the particles at the inner region and direct them tangentially of the circumferential flow so that the particles assume a component of directional flow as indicated by arrow 110. The particles lose momentum as they reach an area of the process chamber where the kinetic energy of the fluid flow is low enough to allow the particles to return to the general flow path and downwardly of the bed as indicated by arrow 112. By displacement, the particles then move back towards the inner portion of the bed as indicated by arrow 114. Hence the particles are traveling circumferentially of the processing zone and at the same time are circulating in the direction of arrows 110, 112 and 114 to in essence provide a helical motion for the particles as the bed circulates.

Figure 4A:
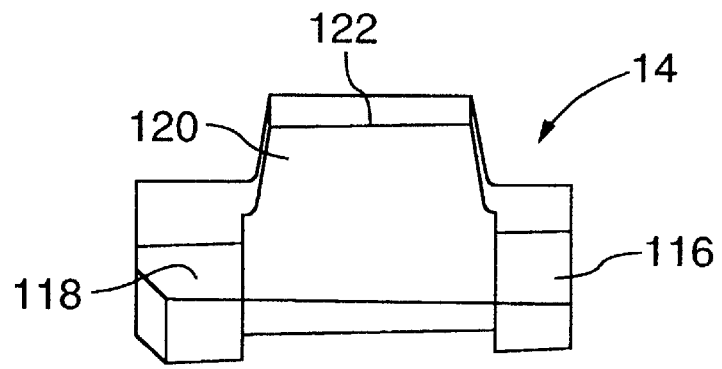
FIGS. 4A, 4B and 4C are respective front, top, and side views of vanes used in the base of the processing zone.
Figure 4B:
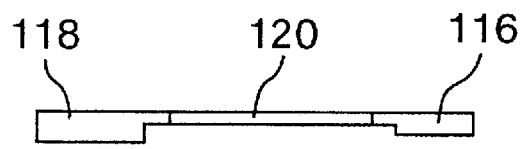
Figure 4C:
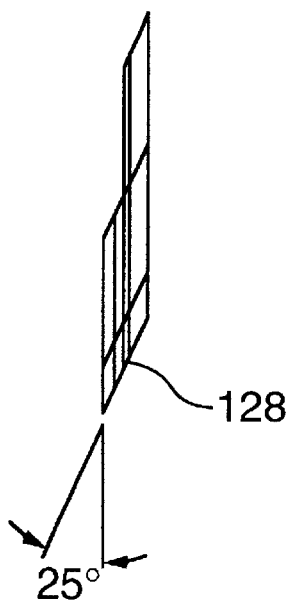
Figure 5:
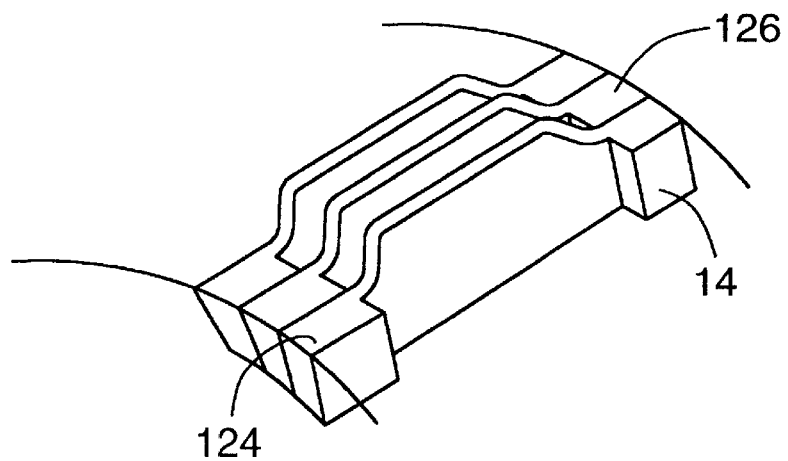
FIG. 5 is an isometric view showing the relationship between the vanes.
Figure 6:
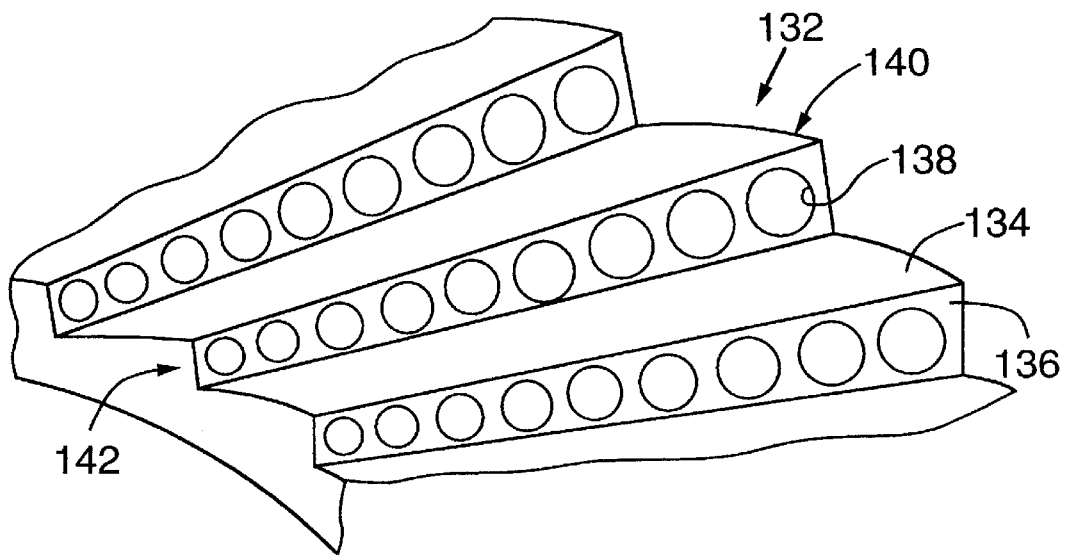
FIG. 6 is a view similar to FIG. 5 and showing an alternative embodiment with different vanes.

The functional relationship of the vane angle and gas velocities and volumes are selected such that the kinetic energy change that occurs when the processing fluid leaving the restrictions 120 (FIG. 4) formed in the vanes 14 and impacts on the underside of the processing bed base above must be sufficient to maintain the processing bed in motion both circumferentially and helically. As the processing bed depth increases with increase in bed diameter, the kinetic energy delivered must increase in due proportion. As shown in FIGS. 4A, B and C a preferred shape of the vanes for defining the vane restrictions 120 are shown. Each vane generally designated 14 has inner and outer lug portions 116 and 118 with a recessed central channel forming the restriction 120 and terminating in a raised vane surface 122. As shown in FIG. 4B, lug portion 118 is thicker than lug portion 116 to define the radial extension of each vane. With reference to FIG. 5 each vane 14 extends radially outwardly and hence the spacing between each vane is determined by lug 116 in region 124 is narrower than the spacing 126 as determined by the thicker lugs 118. Hence the opening between the vanes is somewhat pie-shaped to provide a greater volume of processing fluid or gas at the outer extremity of the bed where the bed is deeper. In order to direct the angle of the processing fluid or gas flow the base 128 of each vane has an angle such that when placed on the vane supports 68 and 70 the required processing fluid or gas flow direction is achieved. The preferred angle for the vane is in the range of about 10 to 45 degrees and most preferably a vane angle of about 25 degrees.

The processing bed may also be defined by a complex shaped air distribution system 132 which has sequentially raised portions 134 with vertical faces 136 and each vertical face has a plurality of serially aligned nozzles 138. The largest nozzle is located at the bed outer extremity 140 and the smallest nozzle is located at bed inner extremity 142. The nozzles are sequentially larger as they progress in the vertical face 136 from the inner extremity 142 to the outer extremity 140. This series of small circular nozzles arrayed along a radial line of the reactor bed provide the desired ratio of fluid flow between the nozzles increasing in proportion with distance from the centre line of the reactor. Other alternative configurations include a set of turbine blades where the blades are rotating about the centre line of the reactor and are profiled so as to achieve mass flow distribution along the blade increasing in proportion with distance from the centre line of the circular reactor. Alternatively the outlet spin and direction of fluid flow generated by a centrifugal fan or axial flow fan impeller blade may be used to provide the direction of fluid flow pattern required with or without appropriately shaped vanes to distribute the flow in the correct proportion across the annular chamber base.

It is understood that the vane structures as needed for high temperature operation may be made of ceramic and are designed to expand and contract without restriction. The vanes may be retained between the refractory components which comprise inner vane support 70 and outer vane retainer 72 of FIG. 2.

The central discharge through the throat 78 FIG. 1) is a significant advantage over the prior system of applicant as described in U.S. Pat. No. 4,479,920. The bed may be forced to discharge through the throat 78 without disturbing the preferred controlled flow pattern of the particles in the bed as described with respect to FIG. 3. As particles are added to and are retained within the compact bed they initially circulate adjacent to the outer wall of the chamber. As more particles are added the bed expands towards the center of the chamber. The outlet for the throat 78 is an area where process fluid flow is insufficient to support the mass of particles above the bed base and hence gravity is used to squeeze discharge particles from the bed and flow through throat 78.

The particulate material outlet provided at 82, in FIG. 2, is also a significant advantage over the prior system of applicant as described in U.S. Pat. No. 4,479,920 in the form of an outlet or opening in the outside wall directly adjacent to the point of impact of the process fluid on the underside of the outer extremity of the bed of particles. As the particles enter the reactor to be processed the mass in the bed increases and thus the bed drops in elevation and circulates closer to the point of impact of the process fluid at the vane upper edge. As the lower edge of the bed of particles drops below the upper edge of the outlet 82 particles will leave the process chamber through the outlet 82 and as the particles leave the bed the mass of the bed decreases allowing the bed to rise in elevation and circulate further from the point of impact of the processing fluid and thus discharge ceases. By this means a continuous or batch displacement of particles is achieved through the bed in a controlled and predictable manner and in the continuous displacement mode becomes self regulating in that if one stops feeding the bed with new particles the discharge of particles will cease.

In accordance with a preferred aspect of the invention the apparatus and process of this invention may be used to treat catalytic particles through hydrocarbons from the surface thereof. Such an example of the use of this technique is in the recovery of valuable metals from spent catalysts.

The spent catalyst is no longer capable of sufficient catalysis to be economical and so is sent for recovery of the precious group metals (PGMs) contained within the catalyst substrate. The spent catalyst typically comprises a porous alumina substrate whose pores are clogged with carbon and hydrocarbon; in combination at up to 50% w/w. In order to recover the PGMs, the alumina is dissolved chemically as a first step. Significant quantities of carbon or hydrocarbons (more than 5%) hinder the chemical extraction process and thus combustion is used to remove the hydrocarbon and carbon from the catalyst. If the combustion is uncontrolled, the alumina substrate is calcined to sufficient temperature (>1,000° C.) that it changes its crystal phase which reduces the solubility of the alumina and thus reduces the effectiveness of the existing leaching processes.

In this application of the process, a compact bed was formed with a width of 7–10% of reactor diameter, a height at the outside wall of between 2–5% of reactor diameter and at the inside wall a height of less than 1% of reactor diameter. The vanes were formed with the slot through which the process fluid in this case air—was passed opening radially with a free area percentage of 20%.

The mixing of the bed was rapid and uniform such that the catalyst particle temperature was sufficiently controlled within a 750–800° C. temperature band to prevent the alumina crystal change due to uncontrolled combustion and yet to remove the hydrocarbons completely and the carbon to less than 5% w/w.

Although preferred embodiments of the invention have been described herein in detail, it will be understood by those skilled in the art that variations may be made thereto without departing from the spirit of the invention or the scope of the appended claims.

I claim:

1. A process for bringing particulate material into contact with a moving fluid in an annular processing zone to create processed material, the zone having a base and the process including the steps:

generating a circumferentially directed flow of gas in the zone to develop a circumferentially circulating turbulent bed of particulate material within the processing zone;

supplying the particulate material to the processing zone so that the particulate material is circulated in the processing zone to provide a flow path both circumferentially of the processing zone and helically of the zone with the following characteristics:

(i) the flow of fluid is controlled to develop the circulating bed with a width between about 2% to 20% of the bed outer extremity diameter, an inner bed depth of less than 1% of the bed diameter, and an outer bed depth between about 2% to 5% of the bed diameter, and (ii) the flow of fluid is directed at an angle relative to the base of the processing zone in the range of about 10° to 45°; and discharging particulate material from the processing zone after processing in the processing zone.

2. A process as claimed in claim 1 in which the particulate material includes larger and smaller particles, and in which the fluid velocity is controlled so that it is greater than the terminal velocity of the larger particles at point of impact on the base of the bed and less than the terminal velocity of the smaller particles in the space above the bed upper surface.

3. A process as claimed in claim 1 in which the bed width is about 5% to 15% of the bed diameter.

4. A process as claimed in claim 1 in which the flow of fluid is directed by a plurality of outwardly radiating inclined vanes spaced apart to define pie-shaped openings.

5. A process as claimed in claim 1 in which the flow of fluid is directed by a plurality of nozzles arranged along a radial line with the rate of fluid flow through the nozzles increasing in proportion to the distance of the nozzle from the centre of the annular processing zone.

6. A process as claimed in claim 1 in which the circulating particulate material includes particles, and in which the particles are accelerated by the gas flow from the inner bed area in both vertical and horizontal directions to travel tangentially of the circumferential flow until such accelerated particles lose their energy and settle into the circumferentially flowing bed and by displacement are returned inwardly of the bed along the processing zone base so that all particles in the bed are exposed to processing gases to provide for uniform and rapid processing of the particles.

7. Apparatus for processing particulate material in a stream of fluid, he apparatus having:

an annular processing zone including a base;

fluid inlets at the base of the zone arranged to direct fluid into the annular treatment zone to meet particulate material in the zone; the processing zone being shaped to maintain a circumferentially circulating turbulent band within the processing zone in response to the flow of fluid, and being to provide a flow path both circumferentially of the processing zone and helically of the zone with the following characteristics:

(i) the fluid flow creates a circulating bed of particulate material which has a width between about 2% to 20% of the bed outer extremity diameter, an inner bed depth of less than 1% of the bed diameter, and an outer bed depth between about 2% to 5% of the bed diameter; and (ii) the flow of fluid is directed at an angle relative to the base of the processing zone in the range of about 10° to 45°.

8. Apparatus as claimed in claim 7 in which the particulate material includes larger and smaller particles, and in which the fluid velocity is controlled so that it is greater than the terminal velocity of the larger particles at point of impact on the base of the bed and less than the terminal velocity of the smaller particles in the space above the bed upper surface.

9. Apparatus as claimed in claim 8 in which the fluid directing means develops a circulating bed of particulate material which has a width of about 5% to 15% of the zone diameter.

* * * * *